United States Patent [19]

Sasabe et al.

[11] 3,936,752

[45] Feb. 3, 1976

[54] DEVICE FOR PRESETTING A TELEVISION PROGRAM AND THE LIKE

[75] Inventors: Kaoru Sasabe, Ikeda; Hiroaki Kotera, Takatsuki; Toshihide Hane, Sakai; Nobuyoshi Kihara, Amagasaki; Masao Takebe, Neyagawa, all of Japan

[73] Assignee: Matsushita Electric Industrial Co., Ltd., Osaka, Japan

[22] Filed: June 25, 1973

[21] Appl. No.: 373,171

[30] Foreign Application Priority Data

June 27, 1972 Japan .............................. 47-64594

[52] U.S. Cl. ........... 325/396; 200/217; 116/124.1 R

[51] Int. Cl.² ........................................ H04B 1/16

[58] Field of Search ................ 325/396; 178/DIG. 9; 200/217 R, DIG. 36, 35 B, DIG. 1; 307/311; 318/467; 116/124.1, DIG. 26; 250/217 R, 217 DD, 220; 53/19 R

[56] References Cited

UNITED STATES PATENTS

| | | | |
|---|---|---|---|
| 2,097,901 | 11/1937 | Thomas | 325/396 X |
| 3,027,506 | 3/1962 | Stenhammar et al. | 325/396 |
| 3,524,986 | 8/1970 | Harnden, Jr. | 307/311 |
| 3,593,148 | 7/1971 | Cummings | 325/396 |
| 3,686,573 | 8/1972 | McVoy | 325/396 |
| 3,778,721 | 12/1973 | Moran | 325/396 |

*Primary Examiner*—Benedict V. Safourek
*Attorney, Agent, or Firm*—Stevens, Davis, Miller & Mosher

[57] ABSTRACT

A device for use with a television receiver or the like, in which the time of receiving a telecast and the channel number of the telecast are preset, whereby the telecast of the preset channel can be automatically received at the preset time.

7 Claims, 26 Drawing Figures

DEVICE FOR PRESETTING A TELEVISION PROGRAM AND THE LIKE

This invention relates to a presetting device by which the channel selection of a television receiver or the like operation is performed automatically at the designated times according to a preset schedule.

In a conventional television receiver, the selection and changing of the channels have been made by the viewer at each time by reference to a television program carried in a newspaper or according to his memory of the television program or by monitoring the pictures appearing on the screen by changing sequentially the channels. Such a practice in selecting and changing the channels, however, is disadvantageous in that the viewer tends to miss a desired item or important item of the television program, and also it is inefficient with the increasing periods of time in which pictures of undesired telecasts are on the screen.

For attaining automatically this type of programming or the like operation, there has been considered a method in which a desired program is preset by inserting pins in punched holes formed in a program board, or a method in which a desired program is preset in a punched card and an apparatus operates according to the preset program upon reading the punched holes in the card at the times specified by said holes. Although these methods are widely being employed in the numerical control and sequence control of machine tools, etc., they are not applicable to domestic electric appliances by reason of the facts that the programming devices are complicated and large in size, and that the devices can be handled only by skilled personnel. As programming devices for domestic electric appliances, there are known preset timers for radio receivers, sequence timers for automatic washing machines and electronic alarm clocks, but these devices have a limited use mainly for time control only and their functions are simple. There are also known timers capable of presetting a plurality of times concurrently and channel selection times for television receivers which provide for automatic selection of channels in a maximum time interval of about three hours, but these devices suffer from the disadvantage that the functions thereof are complicated and the sizes thereof are large, and therefore, they are usable only for specific applications.

It is, therefore, an object of the present invention to provide a presetting device which eliminates the disadvantages of the conventional television receiver described above and which enables the selection of channels to be performed automatically according to a preset program and facilitates the presetting operation.

Another object of the invention is to provide a presetting device of the character described above, in which means for indicating channel numbers are provided on time pointer means which indicate times at their set positions, whereby the construction of the device is simplified.

Still another object of the invention is to provide a presetting device of the character described above, in which recording means for presetting the channel numbers therein is provided separately from the time pointer means, whereby the presetting operation is further facilitated.

According to the device of the invention, when the time pointer means respectively have once been set in selected time positions, the device reads control information from the control information recording means at each of the times corresponding to the set positions of the time pointer means, and controls the operation of an apparatus to be controlled thereby. The content of the program preset by the device is obvious to the user as the program is established by the time pointer means set on a program board and the recording means in which the control information is set, and the handling of the device is easy as the device is of a timing system. The device of the invention is usable for multiple purposes as the cord used for the time pointer means may be optional. The use of the subject device for the control of a television receiver is advantageous in avoiding the casual missing of a desired item of a television program and in eliminating the trouble of the viewer repeatedly checking a television program carried in a newspaper, and further in preventing children from looking at the telecast without any definite purpose, which is advantageous from the point of view of education. Further, the device of the invention serves as an alarm clock.

FIG. 1 is a front elevational view of an embodiment of the device for presetting a television program and the like;

Figure 3:
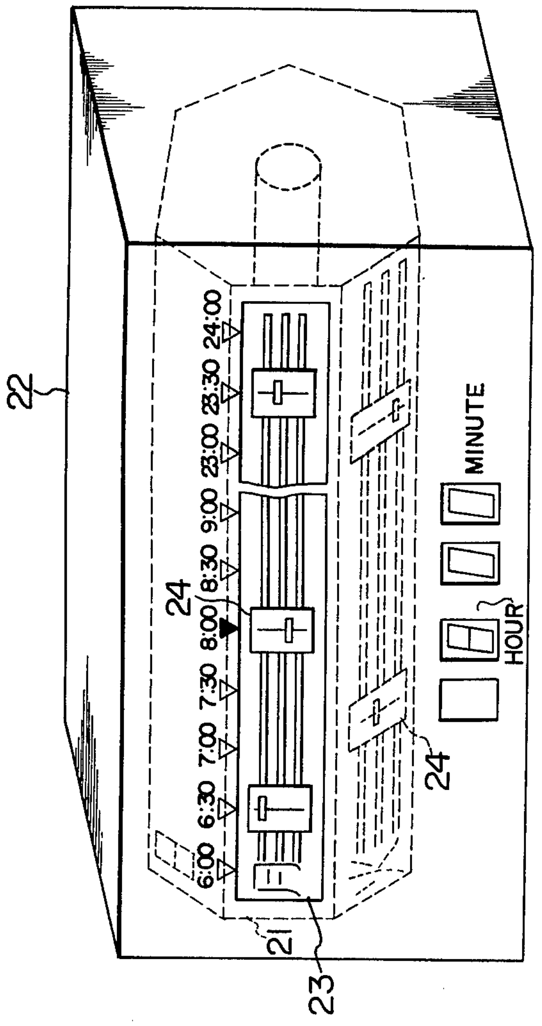
FIG. 3 is a perspective view of another embodiment of the device of this invention.
Figure 5:
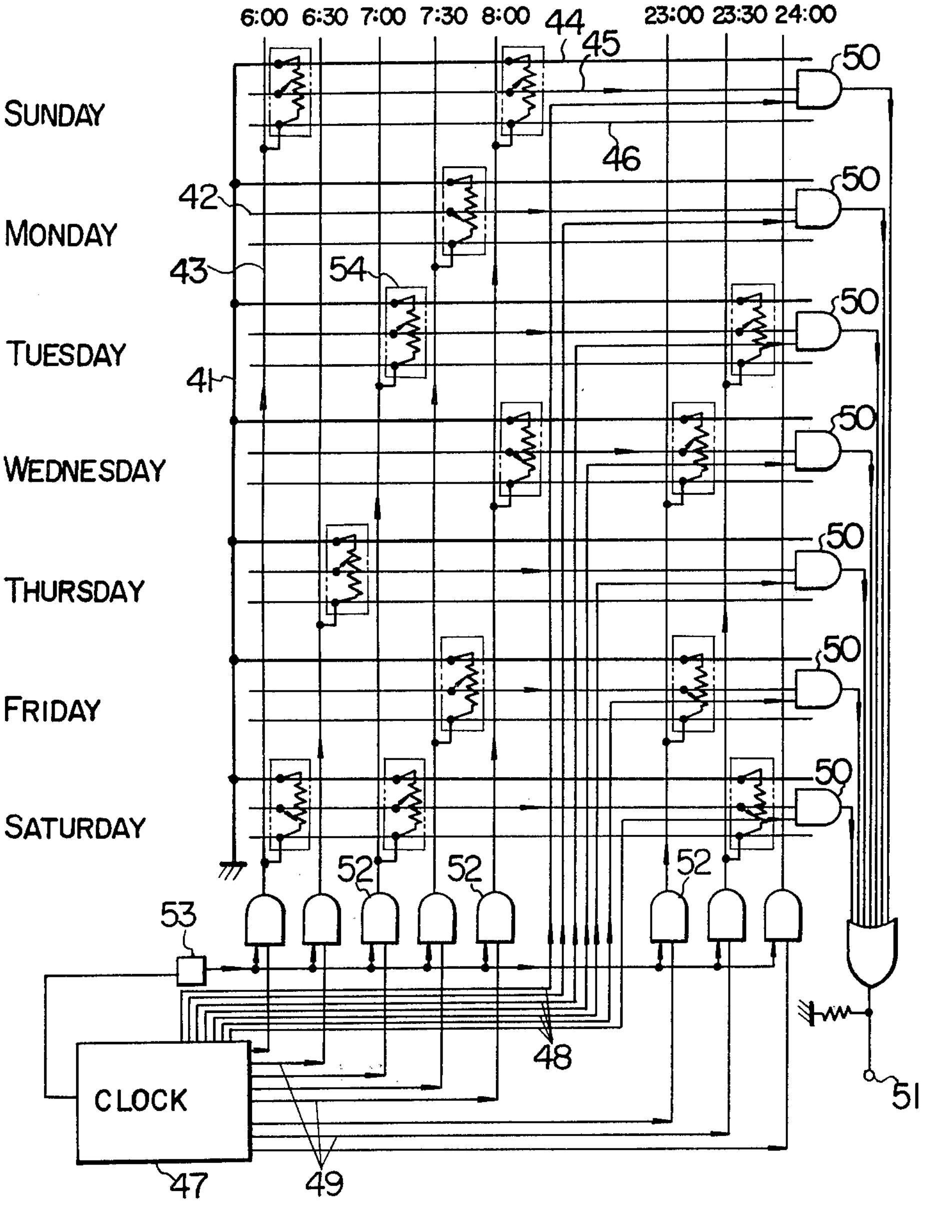
Figure 6:
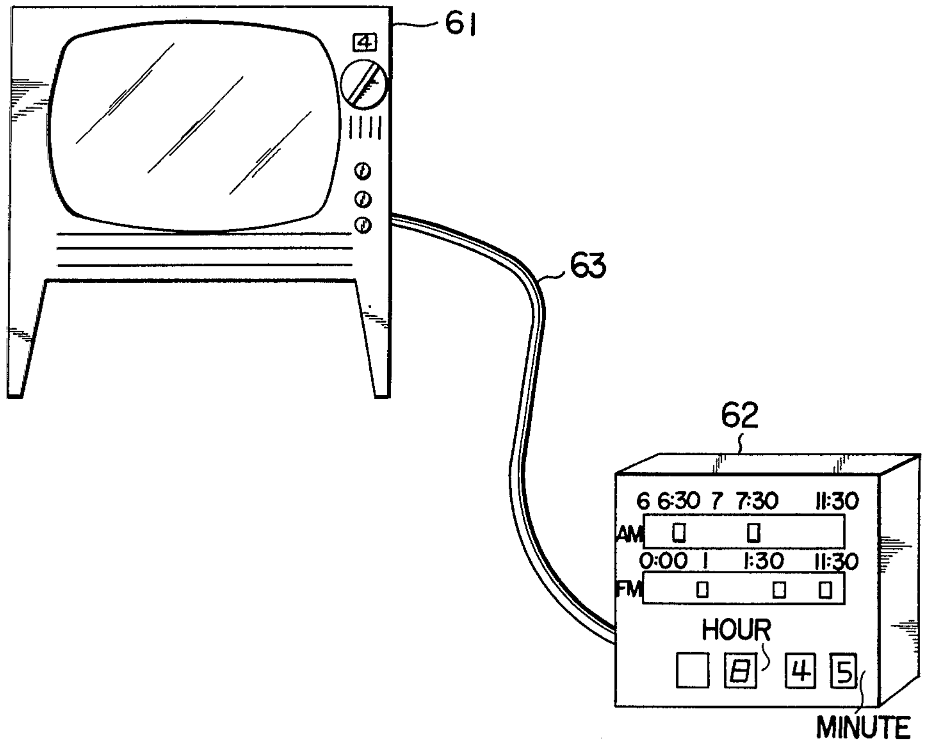
Figure 7:
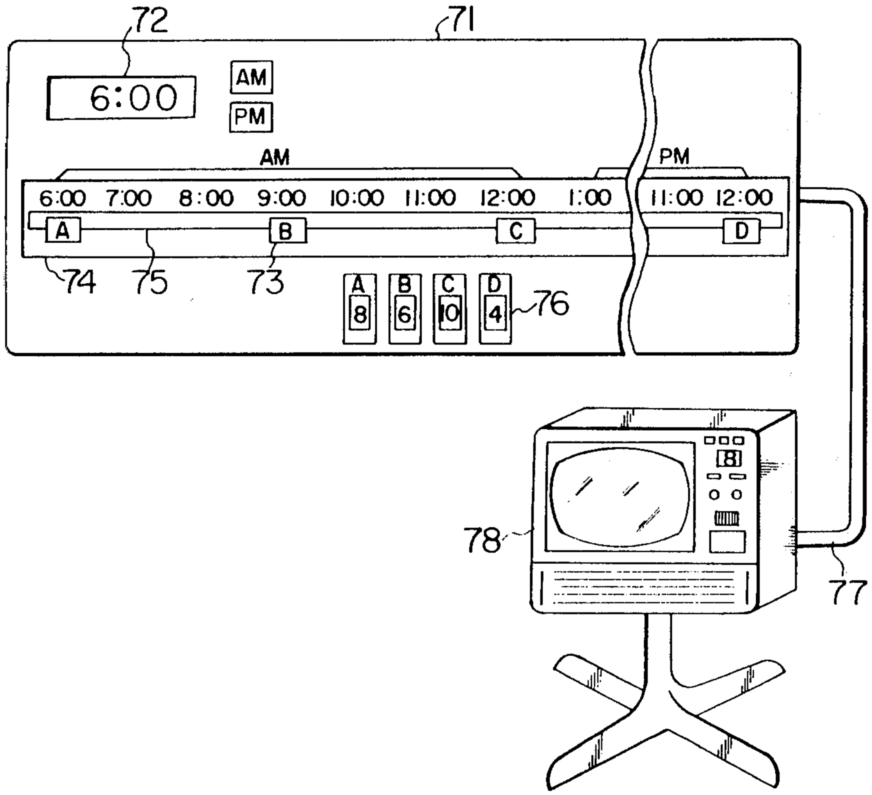
Figure 8:
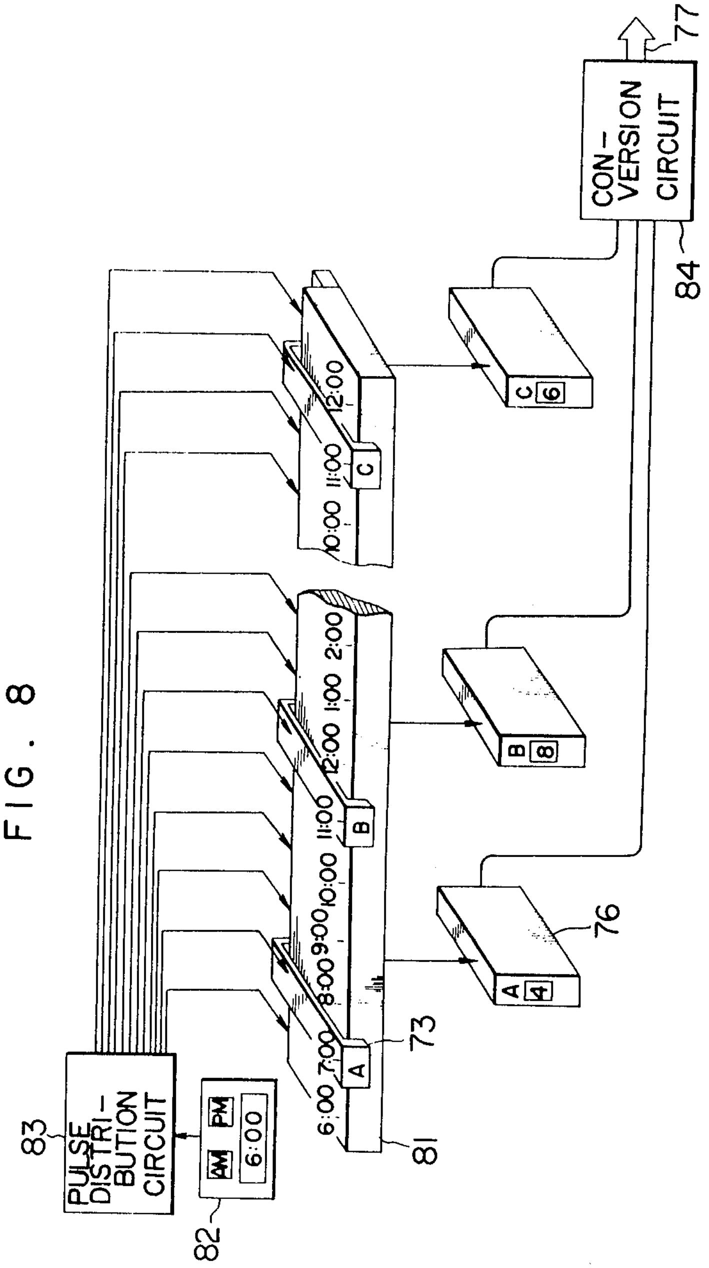
Figure 9A:
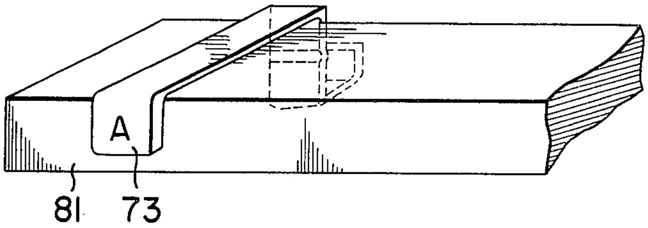
Figure 9B:
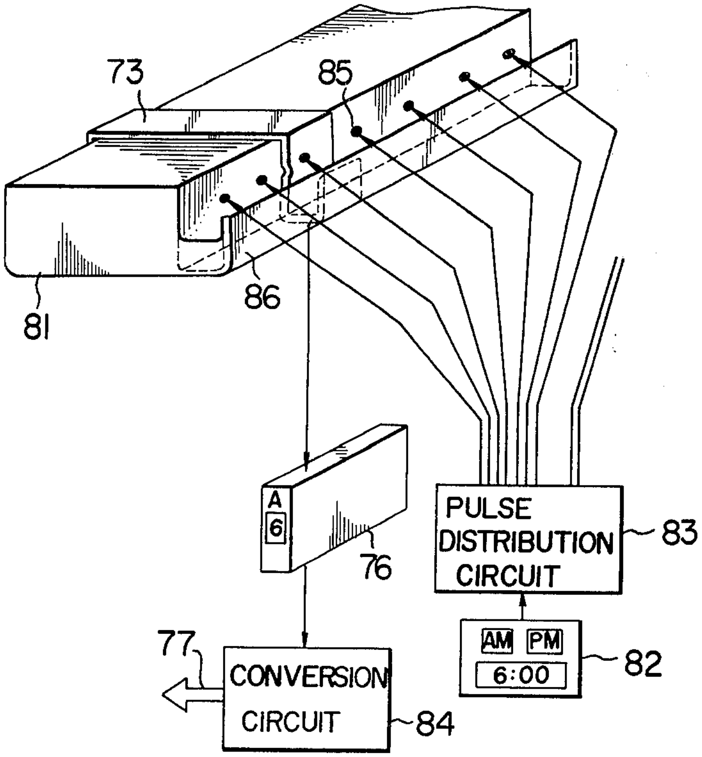
Figure 10:
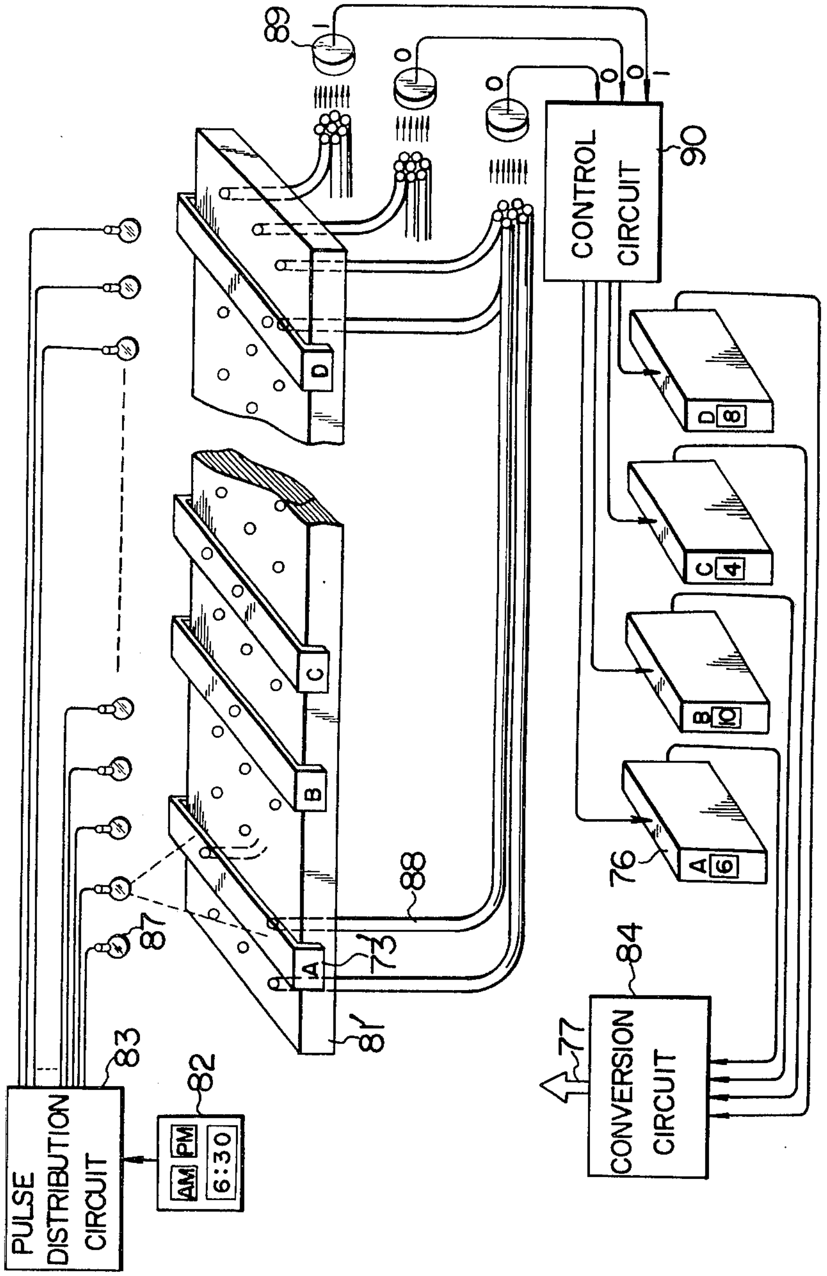
Figure 11:
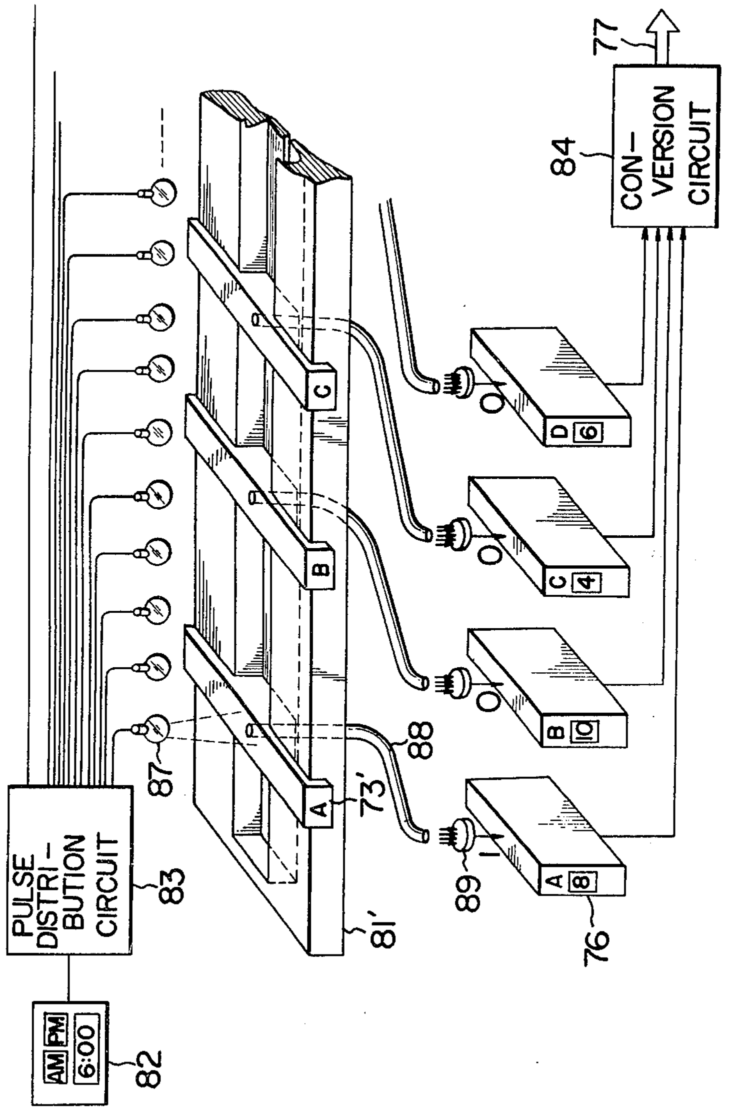
Figure 12:
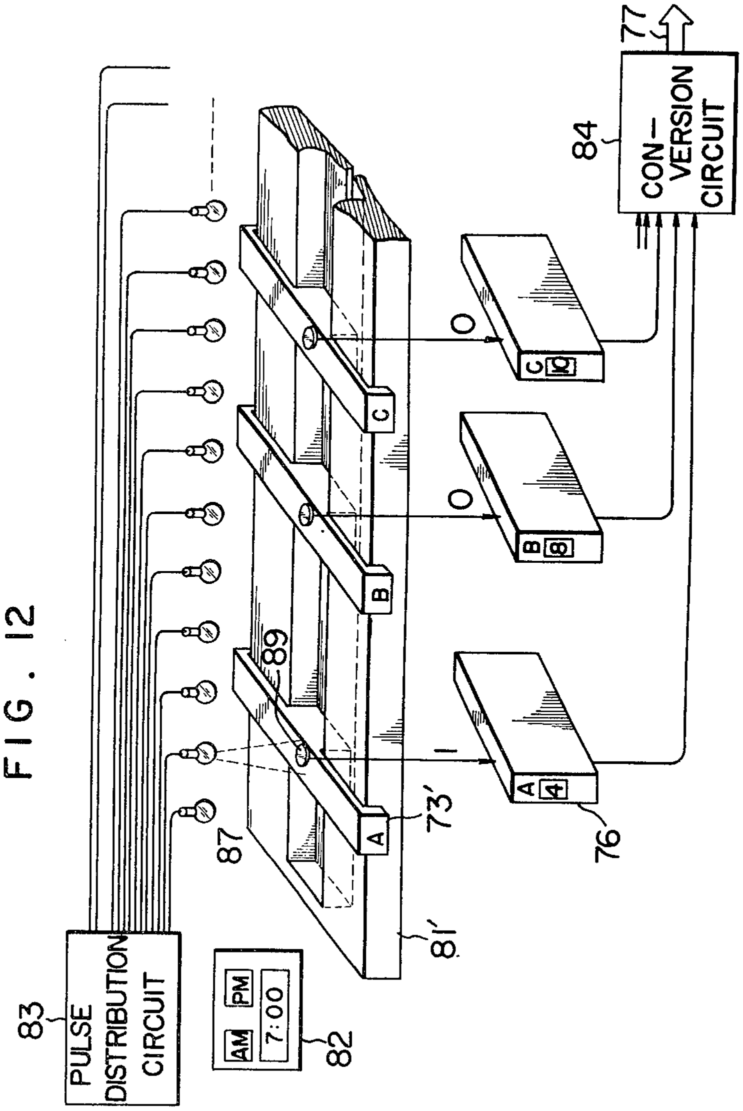
Figure 13:
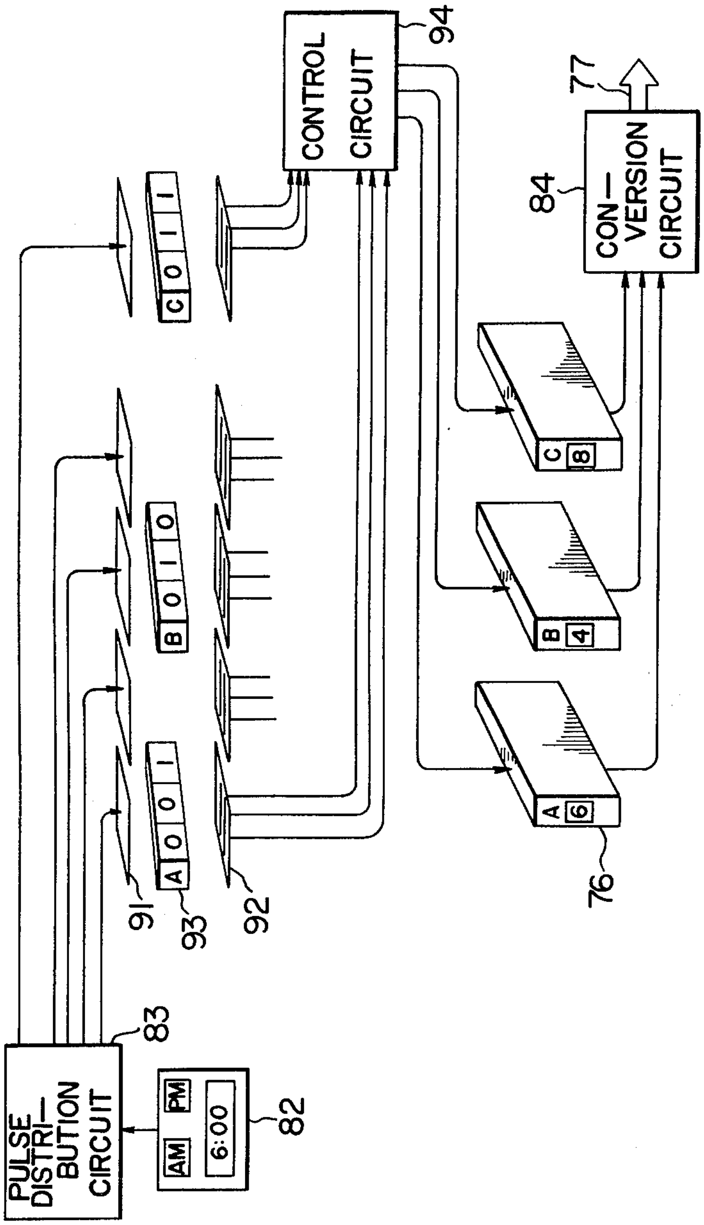
Figure 14:
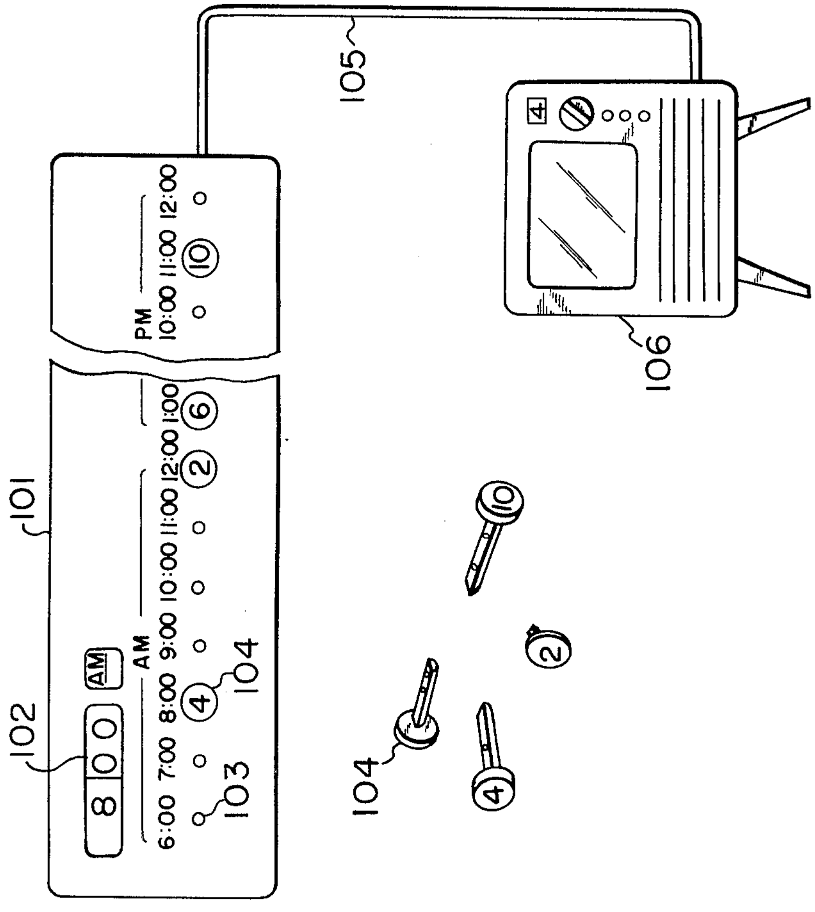
Figure 15:
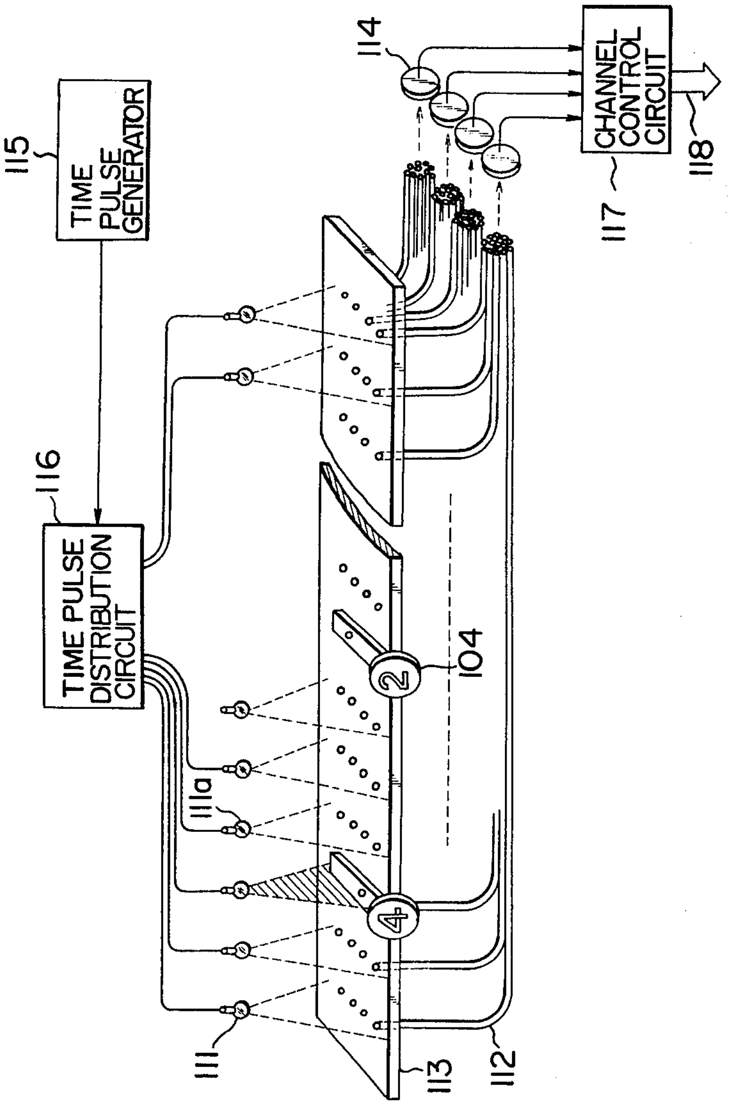
Figure 16:
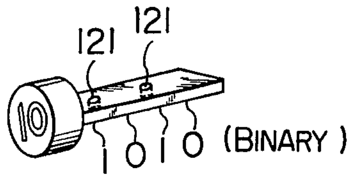
Figure 17:
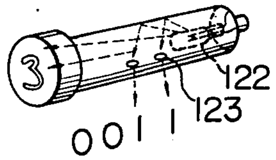
Figure 18:
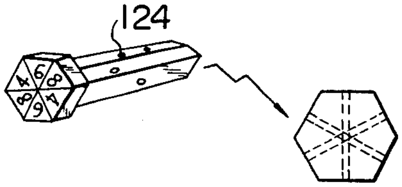
Figure 19A:
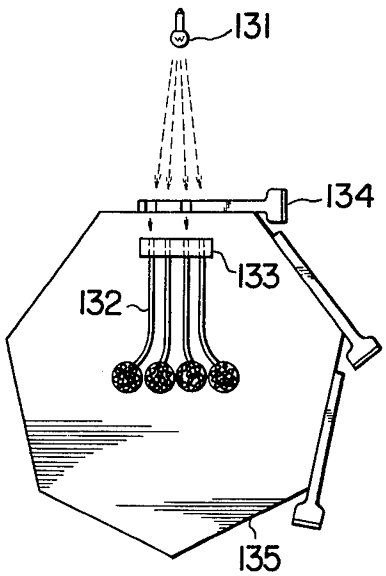
Figure 19B:
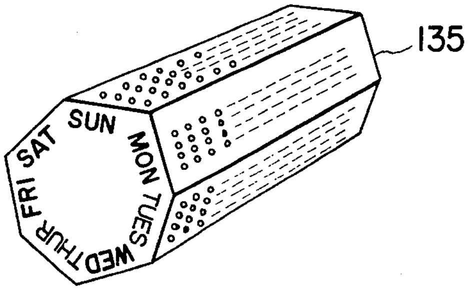
Figure 20:
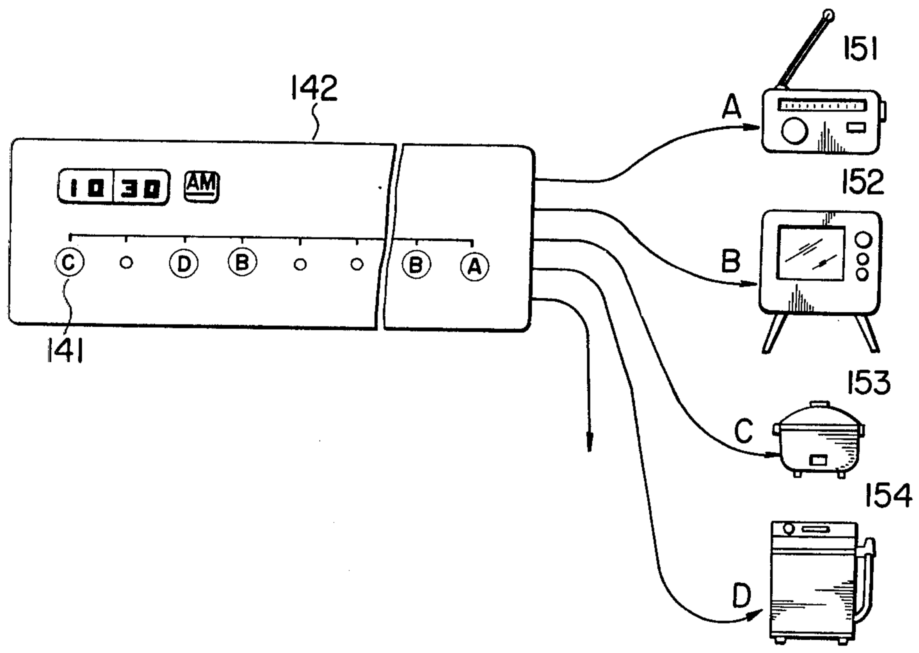

FIGS. 4*a* to 4*e* are perspective views of the time pointer means of the device of FIG. 3;

FIG. 5 is an electric wiring diagram of the program board;

FIG. 6 is a view showing the presetting device in use;

FIG. 7 is a front elevational view of still another embodiment of the device of this invention;

FIG. 8 is a block diagram showing the internal construction of the device of FIG. 7;

FIGS. 9*a* and 9*b* are perspective views of the time pointer means and the support block respectively of the device of FIG. 7;

FIG. 10 is a perspective view showing another internal construction;

FIG. 11 is a perspective view showing still another internal construction;

FIG. 12 is a perspective view showing still another internal construction;

FIG. 13 is a perspective view showing still another internal construction;

FIG. 14 is a front elevational view of still another embodiment of the device of this invention;

FIG. 15 is a perspective view showing the internal construction of the device of this invention;

FIGS. 16 to 18 are perspective views of different types of program setting pins respectively;

FIGS. 19*a* and 19*b* are views showing another type of program board;

FIG. 20 is a view showing another way of using the device.

The present invention will be described hereunder as applied to an automatic presetting device for a television receiver.

Figure 1:
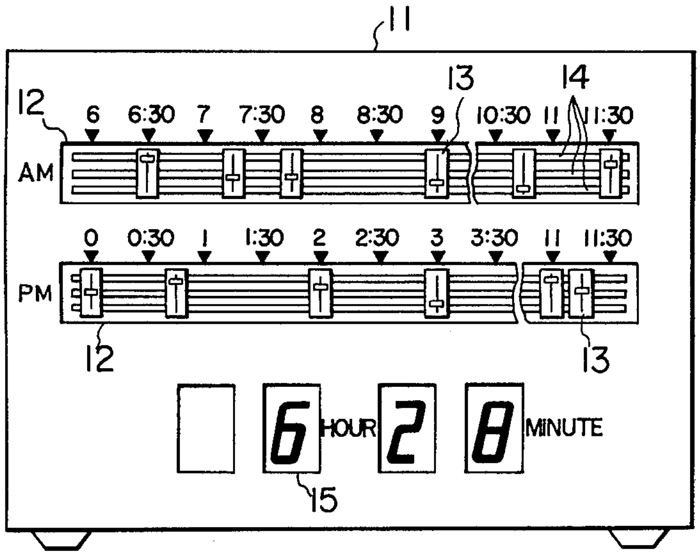

In FIG. 1, reference numeral 11 designates a main body of the automatic presetting device and 12 designates program boards. The program boards 12 are respectively provided with slots 14 in which time pointer means 13 are slidable longitudinally of said slots to be set at the positions of time markings which are provided at an interval of 30 minutes from 6:00 A.M. to 11:30 P.M. Each time pointer means 13 is disengageable from the slots 14 in each program board 12. A presetting operation is completed by setting the respective time pointer means 13 at the positions of the desired times on the program boards 12. For instance, one time pointer means 13 is set at the position of 6:30 A.M. to select channel 2 at said time. A time indicator means 15 is showing 6:28 A.M. but when the time arrives at 6:30 A.M., the device reads the information recorded by the time pointer means 13 at the position of said time and the tuner (not shown) of the television receiver operates in response to said information, whereby the channel is changed to channel 2.

Figure 2:
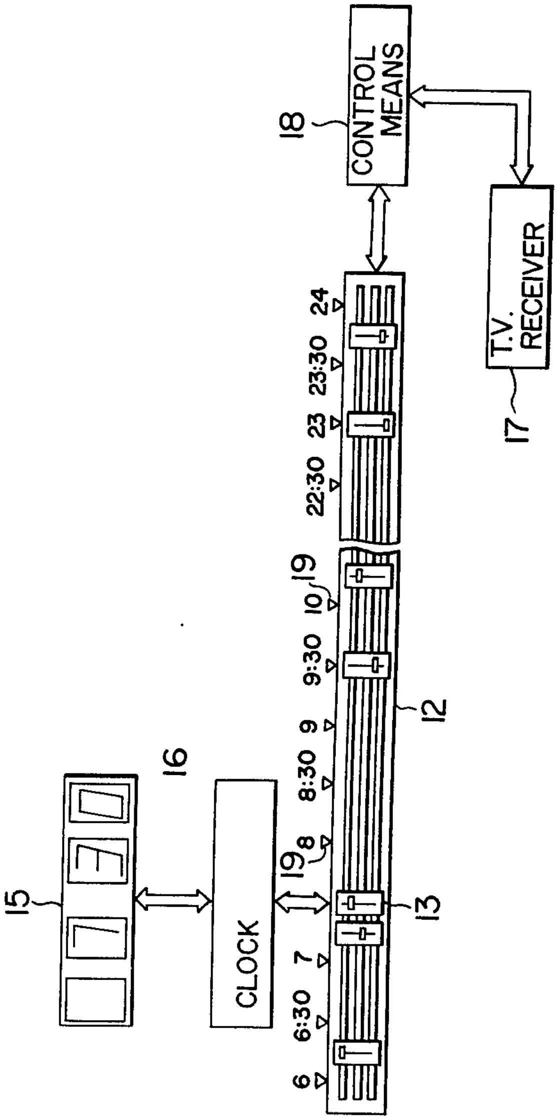
FIG. 2 is a block diagram showing the internal construction of the device.

FIG. 2 shows the entire arrangement of this embodiment of the invention. The positions of the time pointer means 13 set on the program boards 12 at selected time positions are read sequentially by a read-out operation of a time piece, i.e. clock 16 and a recorded information of the time position information of said time pointer means 13 is supplied to control means 18 which in turn controls the channel selecting operation of the television receiver 17. While the positions of the time pointer means 13 are being sequentially read, light emission elements 19 are sequentially lighted indicating the specific time pointer means 13 which is being read.

FIG. 3 shows another embodiment of the invention which is designed for programming over a period of one week. In this embodiment, a program board 21 is in the shape of a heptagonal prism and provided with time pointer means 24 on each face thereof, and an arrangement is made such that each face of said heptagonal program board is exposed to the outside through a window 23 formed in a casing 22 of the device for programming for each day of the week. Time pointer means 24, similar to those 13 of the preceding embodiment, are disengageably mounted on the program board 21. Further, in this embodiment, the amount of information to be preset is larger than in the preceding embodiment, but the appearance is the same as that of the embodiment of FIG. 1 which is for one day programming, as only one face of the program board for one day programming is visible to the outside. Setting of the desired programs for the respective days of the week is effected through the window while rotating the program board to locate the faces of said board at the position of the window 23 one after another, and there is no possibility of erroneous setting because only one face appears in the window at a time.

Figures 4A, 4B, 4C, 4D, 4E:
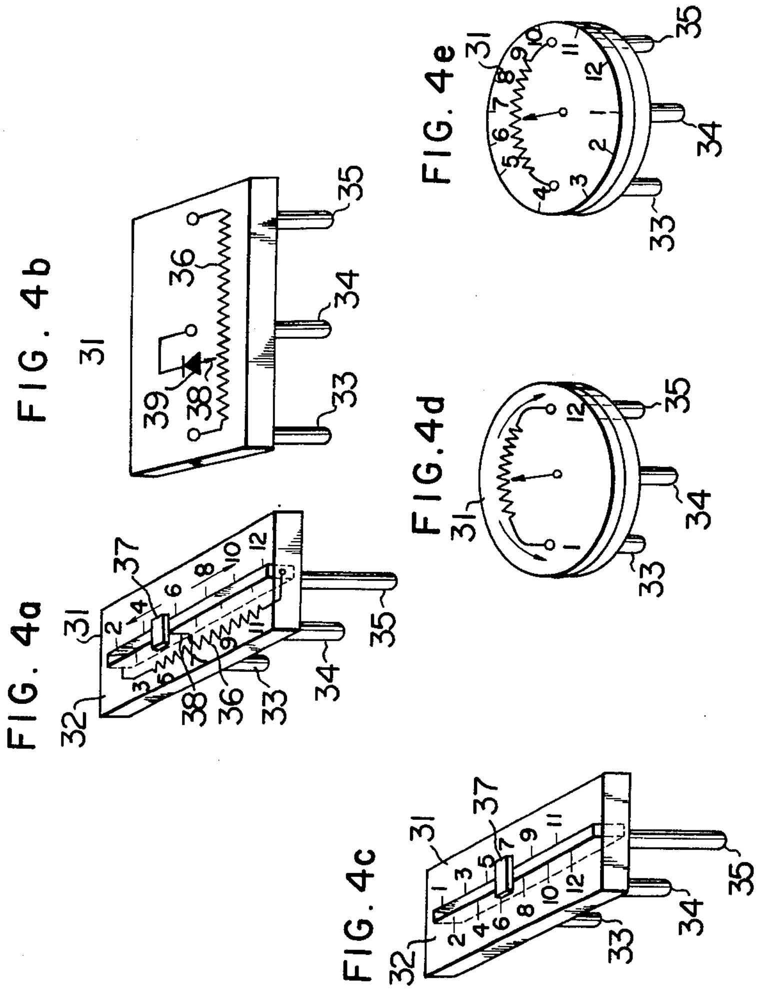

FIGS. 4*a* to 4*e* show different types of time pointer means. The time pointer means includes a plate member 31 having the identification of information recorded therein, e.g. channel numbers 1, 2, . . . 12, marked on the upper side thereof and pins 33, 34, 35 extending downwardly from the underside thereof, a resistance 36 enclosed therein as shown in FIG. 4*a*, and a knob 37 provided on the upper surface thereof for a sliding movement thereon and carrying a terminal 38. A diode 39 may be connected as shown in FIG. 4*b* to avoid interference of the time pointer means with each other when said time pointer means are fitted in the program board. The time pointer means of the types shown in FIGS. 4*a* and 4*b* are so designed that the channel information may be changed continuously briefly with reference to the channel numbers marked on the upper surface 32 of the plate member 31, but the type of the time pointer means shown in FIG. 4*c* has the channel numbers marked in the definite positions of the respective channels and is provided with ratchets therein at locations corresponding to the position of the markings of channel numbers, so that the knob 37 is operated intermittently to change the channel information and a more correct position of the desired channel can be obtained. The type of the time pointer means shown in FIG. 4*d* has a round shape and is of a construction similar to that of a round variable resistor. The type of the time pointer means shown in FIG. 4*e* is also round in shape but provided therein with ratchets similar to the type of FIG. 4*c*, and the channel can be set in a more correct position.

FIG. 5 shows the electrical connection of the program board 12 or 21. The wiring of the program board is composed mainly of grounding conductors 41, output conductors 42 and scanning conductors 43. The grounding conductors 41 and output conductors 42 are extended along the slots 44 and 45 of the three slots 44, 45, 46 formed in the program board for sliding movement of the time pointer means 54. On the other hand, an output is applied from the clock 47 to week scanning conductors 48 and hour-minute scanning conductors 49, and the week scanning conductors 48 selectively lead the output conductors 42 to an output terminal 51 through week selection gates 50 respectively. The hour-minute scanning conductors 49 serve to read at a timing of 30 minute intervals, 15 minute intervals or 1 hour intervals through hour-minute selection gates 52 in accordance with selector means 53. The arrangement of FIG. 5 is adapted to read the timing of 30 minute intervals. For instance, a voltage of 6V corresponding to channel 4 is obtained from the pin 34 of the time pointer means 43 at 8 o' clock on Sunday and said voltage appears at the output terminal 51 through the week selection gates 50 and an OR circuit. In this case, the voltage applied to the pin 46 of the time pointer means 43 is constant (e.g. 30V). In the event that the tuner of the television receiver is of the type which selects channels by the barrier capacity of a varactor diode, it is possible to arrange it such that channel 4 may be selected when a voltage of 6V is applied to the varactor diode, for example. Therefore, once the voltage has appeared at the output terminal 51, the channels may be freely selected by impressing the voltage on the aforesaid tuner through a circuit adapted to maintain said voltage. Alternately, the device may be connected with means for automatically selecting channel 4 by a voltage comparator when a voltage of $6V \pm 0.2V$ has appeared at the output terminal 51.

It is optional whether the subject device is incorporated in the main body of the television receiver or other apparatus, or is used as an adapter in combination with a separate remote controller.

FIG. 6 shows an embodiment of the device as used in combination with a remote controller. In the illustration of FIG. 6, the automatic program presetting device 62 of the invention is connected to a remote control type (wired) television receiver 61 by a cord 63, so that the channel is set selectivelly automatically in the television receiver 61 in response to channel information transmitted from the automatic program presetting device 62 at a preset time. An arrangement is made such that the channel of the television receiver 61 is first returned to the O position (a predetermined position or channel of the tuner) instantaneously when a signal is transmitted from the automatic program presetting device 62, and the television receiver 61 transmits a signal to said device, representative of the completion of the return movement of the tuner. Thereafter, the device 62 transmits channel information to the television receiver in response to the return signal to set said television receiver at the desired channel. The same effect may be obtained by connecting the television receiver 61 and the device 62 with each other by a wireless means, such as an ultrasonic wave, instead of the cord 63.

Although the device of the invention has been described above as applied to the television receiver, it is similarly applicable to radio receivers.

Still another embodiment of the invention will be described with reference to FIG. 7. In FIG. 7, reference numeral 71 designates a main body of the program presetting device; 72 a real time clock; and 73 sliding type time pointer means which is slidable in the longitudinal direction of a program board 74 in a slit 75 formed in said program board. The program board 74 is provided with time markings at a one-hour interval from 6:00 A.M. to 12:00 P.M. For the selection of a program, two types of information must be preset, that is, time information and channel information. In this embodiment, the selection of time is made by presetting the time pointer means 73 at the desired times, and the selection of the other information (the channel number in this case) is made by control information recording means 76 provided each for each time pointer means 73. Each time pointer means 73 and the corresponding control information recording means 76 are electrically connected with each other, and the cooperating time pointer means and control information recording means are visually identified by the same characters or color. When the real time of the clock 72 coincides with the time at which the time pointer means 73 is set, a signal is transmitted to the control information recording means 76 corresponding to said time pointer means 73 and a channel corresponding to the control information stored in said recording means 76 is selected. The control information recording means 76 used in this embodiment may be slide switches or thumb wheel switches. While it has been stated that the times which are designated by the time pointer means 73 are provided on the program board 74 at a one-hour interval, the interval of the times may be changed freely as desired and in a time span other than from 6:00 A.M. to 12:00 P.M. Reference numeral 77 designates a cable through which the channel information stored in the control information recording means 76 is transmitted to the television receiver 78 after it has been converted into a control signal suitable for channel selection.

In the illustration of FIG. 7, there is shown a state in which the clock 72 indicates 6:00 A.M. as the real time and channel 8 is selected just at this time. The control signal for channel selection may, for example, be a voltage signal corresponding to the desired channel in the event that the tuner of the television receiver 78 is an electronic tuner which selects the channels by the barrier capacity of a varactor diode. In the event that the tuner of the television receiver 78 is a detent type tuner, a pulse signal adapted to control the rotation of the tuner is used as the control signal for channel selection.

FIG. 8 shows the internal arrangement of channel information reader means. Reference numeral 81 designates a support block to provide for smooth sliding movement of the time pointer means 73, which is provided with contacts for detecting the time pointer means 73 being in coincidence with the time at which said time pointer means is to be set. Reference numeral 82 designates a circuit which generates, in cooperation with the real time clock, time pulses at an interval of 30 minutes or 1 hour, and 83 designates a distribution circuit for sequentially distributing the time pulses. The signals transmitted sequentially from the distribution circuit 83, when it coincides with the time at which the time pointer means 73 is set, causes the control information recording means 76 to generate an output representing the channel information preset in said recording means 76, and said channel information is supplied to a conversion circuit 84 in which it is converted into a control signal for channel selection. The converted signal is supplied to the television receiver through the cable 73 to cause it to make a channel selecting operation.

FIGS. 9*a* and show 9*b* in detail the construction of the support block 81 in which the detection of coincidence between the signals from the distribution circuit 83 and the designated times is effected, and the construction of the time pointer means. To the signal lines from the distribution circuit 83 are connected the contacts 85 provided on the support block 81, and the time pointer means 73 are provided with contacting portions for intimate contact with said contacts 85 on the support block 81, respectively. When the electric contact is established between the contact 85 and the time pointer means 73, or when the time from the distribution circuit coincides with the time designated by the time pointer means, the coincidence signal is transmitted to the control signal recording means 76 and the selection of the channel in the television receiver is effected as described above. The sliding movement of the time pointer means 73 may be further facilitated when oil or the like lubricant is disposed in an oil receiving portion 86 of the support block 81.

Further embodiments of the invention are shown in FIGS. 10, 11 and 12. In these embodiments, the time pointer means 73′ are of the photoelectric type, and the cooperating time pointer means 73′ and control information recording means 76 are provided with the same characters A, B, C . . . . Further, the time pointer means 73′ are provided with, as information codes, binary codes for selecting the control information recording means 76. For instance, the time pointer means 73′ indicated in the Figures by alphabet A is provided with a hole at the third bit position and that indicated by alphabet B with a hole in the second bit position, thus A corresponding to a binary code of 001, B to a binary code 010 and so on. Reference numeral 87 designates lamps for illuminating the information codes of the time pointer means 73′; 88 optical fibers for leading out the information codes; and 89 photosensor arrays. The time pointer means 73′ are set in intimate contact with the support block 81′ and, when they are illuminated by the lamps 87 from the upper side, the information codes of said means propagate through the optical fibers and are transmitted to the photosensor arrays 89 as light intensities, by which they are converted into electric signals and fed to the control information recording means 76 through a control circuit 90. FIGS. 10, 11 and 12 show a state in which the read time is 6:30 A.M. and the lamp 87 corresponding to the time is turned on and the channel information representative of channel 6 of the control information recording means 76 is being read. The large amount of optical fibers 88 connected to the support block 81' are bundled for each bit and led to the corresponding photosensor arrays 89. Therefore, the information codes of the time pointer means 73' are all supplied to the common photosensor array 89 no matter at which time positions they may be read. Namely, the bundles of the optical fibers 88 serve as "or" elements of light. In the case of FIG. 10, since the time pointer means 73' of A is provided with the through-hole at the third bit position, the binary code 001 is detected at the photosensor array 89. The output of the photosensor array passes in the control circuit 90 and selects the control information recording means 76 of A. Therefore, the channel information representative of channel 6 is converted by the conversion circuit 84 into a control signal for channel section and the channel is changed in response to said control signal. The through-holes provided in the time pointer means 73' used in these embodiments are used as fixed memories which do not disappear.

In the embodiment shown in FIG. 11, the optical fibers 88 are not fixed to the support block 81' as they are in the embodiment of FIG. 10, but are connected directly with the time pointer means 73', so that said optical fibers may move together with the time pointer means 73' as said time pointer means slide on the support block 81'. By connecting the optical fibers 88 directly with the time pointer means 73' as stated, the number of the optical fibers can be substantially decreased from that in the embodiment shown in FIG. 10.

FIG. 12 shows an embodiment in which no optical fibers are used. Namely, the photosensor arrays 89 shown in FIG. 10 are embedded in the time pointer means 73' without providing them externally, for directly receiving the light of the lamps 87, whereby more accurate electric signals can be obtained.

FIG. 13 shows a further embodiment of the invention in which are employed electrostatic capacity type control information recording means 84 for the selection of channels. The pulses successively transmitted from the distribution circuit 83 are applied between electrodes 91 and opposite electrodes 92 each made up of three parts, and between these opposite electrodes are interposed the time pointer means 93 each consisting of dielectrics of different dielectric constants put together into a unitary piece. Therefore, when the pulse is applied across the electrodes 91 and 92, signals of different amplitudes generate from the sectional electrodes 92 according to the state of combination of the dielectrics. By reading the signals by the control circuit 94, an output of 001, for example, is obtained from the time pointer means 93 of A and the corresponding control information recording means 76 is selected by said output signal, whereby the channel information representative of channel 6 is fed to the conversion circuit 84. The signal converted in the conversion circuit is transmitted to the television receiver through the cable 77 to change the channel to channel 6.

While in the embodiments described hereinbefore, the time pointer means are slidable horizontally on the program board of the type for one day programming, the device may be designed such that the time pointer means are slidable vertically. Further, by arranging the time markings in a circular diagram on the program board, the programming operation can be achieved more easily in relation with the real time clock. It is also to be understood that the device may be modified for programming over a period of one week.

The presetting device may be produced with a chime which is arranged to sound at a preset time concurrently with the changing of the channel to a preset channel. It is also possible to make an arrangement such that the channel number appears on the picture screen of the television receiver for a period of several seconds after the channale has been changed. A clock having a number of mechanical contacts may be used for the clock 82 and in this case the function of the distribution circuit may be obtained from the clock, in addition to the timing function.

Still another embodiment will be described with reference to FIG. 14. In FIG. 14, reference numeral 101 designates a program board of the presetting device; 102 a real time clock; 103 pin jack holes arranged along a time marking row; 104 presetting pins respectively provided with channel information to be preset and adapted to be inserted into said pin jack holes; 105 a cable for transmitting control signals; and 106 a television receiver provided with means for changing channels in response to the control signals.

For the automatic channel selection, it is necessary to preset two pieces of information, that is, the time and the channel. In this embodiment, this is achieved by inserting the presetting pin 104 bearing the code of the desired channel into the pin jack hole 103 at the position of the time at which said channel is desired to be obtained. When the real time indicated by the clock 102 arrives at the time corresponding to the pin jack hole 103, the channel designated by the presetting pin 104 inserted into said pin jack hole is selected. The presetting pins 104 of different types are provided in the same number as the number of channels receivable by the television receiver and each of them has a channel number engraved on the head thereof. In this embodiment, the time markings are provided at a onehour interval from 6:00 A.M. to 12:00 P.M., but the interval and time span may be changed freely as desired. For instance, the time markings may be provided at a 15-minute intervals.

The channel information read from a specific presetting pin 104 at a specific time is converted into a suitable control signal for channel selection and transmitted to the television receiver through the cable 105.

In FIG. 14, there is shown a state in which the clock 102 shows the real time being 8:00 A.M. and the channel has just been changed to channel 4 at said time. The control signal for channel selection which is to be transmitted to the television receiver through the cable 105 may be a voltage signal corresponding to the desired channel in the event when said television receiver is of a type having an electronic tuner for channel selection, and may be a pulse signal in the event when said television receiver is of a type having a detent tuner.

FIG. 15 shows the internal arrangement of the channel information reading means, in which reference numeral 111 designates lamps for illuminating the channel information carried on the presetting pins 104; 112 optical fibers for leading the channel information of the presetting pins 104; 113 a fiber support plate; and 114 photosensor arrays. Each presetting pin 104 is provided with the channel information in the form of a 4-bit binary code. For instance, the presetting pin 104 for presetting channel 4 has a hole bored at the third bit position of the pin as 4 (decimal number) = 0100 (binary number). When this presetting pin 104 is set in close contact with the support plate 113 with its hole in register with a hole formed in said support plate and illuminated from the upper side by the lamp 111, the channel information (code pattern) of the presetting pin 104 is transmitted through the fiber 112 to the photosensor array 114 as a light intensity and is converted into an electric signal. Reference numeral 115 designates a time pulse generator having a clock disposed therein and adapted to generate in cooperation with the real time clock time pulses at a predetermined interval, e.g. at an interval of 30 minutes or one hour. Reference numeral 116 designates a time pulse distribution circuit, which distributes the time pulses sequentially to the lamps 111 to flash them. FIG. 15 shows a state in which the lamp 111*a* is lighted at the real time of 8:00 A.M. and the presetting pin 104 for channel 4 is being read. The large number of the optical fibers 112 connected to the support plate 113 are bundled for the respective rows of bits and led to the corresponding photosensor arrays 114. Therefore, the channel information of the presetting pin 104 read at any time position is supplied to the common photosensor array 114. Namely, the bundles of optical fibers serve as or elements. In the event that the presetting pin 104 is for channel 4, a code signal of 0100 is detected by the photosensor array 114 as a binary code. An output of this photosensor array 114 is led to a channel control circuit 117 and, after being converted into a control signal for channel section therein, transmitted to a television receiver through a control cable 118 to set it for channel 4. It will be understood that the indication of the presetting pin 104 of which the channel information is being read, may be made concurrently by suitably arranging the lamps 111.

FIG. 16 shows a type of presetting pin in an enlarged scale. In this type of presetting pin, the binary code which is channel information is provided in the form of drilled holes 121, for example, of a diameter of 2 mm and a pitch of about 3 mm. FIGS. 17 and 18 show other types of presetting pins. The type of presetting pin shown in FIG. 17 has an illuminating lamp 122 disposed therein, so that a light pattern according to the channel information bits will appear from the interior through holes 123 when a time pulse is applied thereto. Since the channel number engraved on the pin is illuminated concurrently when the lamp 122 is lighted, this type is advantageous in that the positive collation of the real time and the position of the pin being read is ensured. The presetting pin of the type shown in FIG. 18 has a polygonal cross-section, so that it alone may be used for setting a plurality of channels by changing the angular position thereof. Reference numeral 124 in FIG. 18 designates through-holes bored in the pin.

The presetting pins described above are of the type which provides channel information in the form of a light signal. There may be used presetting pins of the type in which bits are provided, for example, in the form of white and black markings in lieu of the holes in the types of presetting pins described above, which markings will be read by a reflector.

While the presetting devices of all the embodiments described hereinbefore are designed for programming for one day, it will be understood that they may easily be modified for programming for a period of one week by adding week days thereto. An example of such device is shown in FIGS. 19*a* and 19*b*.

In the embodiment shown in FIGS. 19*a* and 19*b*, a light receiving portion 133 including an illuminating light source 131 and optical fibers 132 is the same as that in the preceding embodiments for one-day programming. The only difference is that presetting pins 134 are supported on a rotary drum 135 of heptagonal cross-section, which is turned one seventh of its full revolution every day to complete one revolution in one week. Such construction enables the presetting device to be provided economically as the illuminating light source and optical fibers can be used commonly for all the days of a week.

An arrangement may be made such that a chime sounds at each time the channel is changed according to the preset program, or the channel number appears on the television screen for a few seconds after the channel change, to ensure the acknowledgement of the channel change by the viewer.

FIG. 20 exemplifies the application of the presetting device of the invention as a multiple purpose timer. In this case, presetting pins 141 respectively bearing characters A representing a radio set 151, B representing a television set 152, C representing a rice cooker 153, D representing a washing machine 154, . . . , instead of channel numbers, are inserted into the program board, whereby a plurality of the electric appliances can be placed in operation according to the desired program, either one after another or concurrently.

What we claim is:

1. A device for presetting a television program or the like, comprising clock means for generating time information, a program board provided with a plurality of time pointer means the positions of which are optionally changed respectively to designate the times at which a television receiver is to be operated, a plurality of recording means provided separately from and each for each of said time pointer means for presetting channels to be received, and means for reading the information recorded in the recording means corresponding to said time pointer means in accordance with the time information generated by said clock means and applying to said television receiver signals for receiving the preset channels.

2. A device for presetting a television program or the like, comprising clock means for generating and distributing time pulses, a program board provided with one time column and with a plurality of time pointer means which are respectively optionally operated to control a television receiver or other electric appliances to be controlled, said time pointer means being similar to a button which is preset at any position corresponding to time, means for setting control information such as a TV channel number or an on-off control for controlling the types or operations of the electric appliances at the times preset by said time pointer means, and means for decoding the control information preset in said program board and setting means in accordance with the time information generated by said clock means to control the operations of the electric appliances to be controlled.

3. A device for presetting a television program or the like, comprising clock means for generating time information, a program board provided with a plurality of time pointer means the positions of which are optionally changed respectively to designate the times at which a television receiver is to be operated, a variable resistance provided in each of said time pointer means integrally therewith to designate a telecast channel to be received, means for reading the positions and designated channels of said time pointer means in accordance with the time information generated by said clock means to control the television receiver such that the telecast of preset channels may be received at preset times, in which each of said time pointer means is mounted on said program board with two fixed terminals and one sliding terminal of said variable resistance respectively received in three parallel slits formed in said program board, means extending along said slits for applying a D.C. voltage to said fixed terminals, and means for applying a voltage obtained from said sliding terminal to the television receiver as a signal to indicate a preset channel.

4. A device for presetting a television program or the like, comprising clock means for generating time information, a program board provided with a plurality of time pointer means the positions of which are optionally changed respectively to designate the times at which a television receiver is to be operated, a plurality of recording means provided separately from and each for each of said time pointer means for presetting channels to be received, means for reading information recorded in the recording means corresponding to said time pointer means in accordance with the time information generated by said clock means and applying to said television receiver signals for receiving preset channels, in which each of said time pointer means is provided with coded through-holes for discriminating it from other time pointer means and said program board is provided with a light source for illuminating sequentially the time positions corresponding to said respective time pointer means in accordance with the time information generated by said clock means, and means for sensing the light projecting through the through-holes of said time pointer means from said light source, whereby the recording means corresponding to said time pointer means are selected by outputs of said sensing means.

5. A device for presetting a television program or the like, comprising clock means for generating time information, a program board provided with a plurality of time pointer means the positions of which are optionally changed respectively to designate the times at which a television receiver is to be operated, a plurality of recording means provided separately from and each for each of said time pointer means for presetting channels to be received, means for reading information recorded in the recording means corresponding to said time pointer means in accordance with the time information generated by said clock means and applying to said television receiver signals for receiving preset channels, in which said program board is provided with a light source for illuminating sequentially the time positions corresponding to said time pointer means in accordance with the time information generated by said clock means, and optical fibers respectively having one of their ends positioned opposite to said time pointer means for receiving the light of said light source therefrom and the other ends positioned opposite photosensors provided each in each time pointer means.

6. A device for presetting a television program or the like, comprising clock means for generating time information, a program board provided with a plurality of time pointer means the positions of which are optionally changed respectively to designate the times at which a television receiver is to be operated, a plurality of recording means provided separately from and each for each of said time pointer means for presetting channels to be received, and means for reading information recorded in the recording means corresponding to said time pointer means in accordance with the time information generated by said clock means and applying to said television receiver signals for receiving preset channels, in which said time pointer means are respectively provided with photosensors which are connected to the corresponding recording means, and said program board is provided with a light source for illuminating sequentially the time positions corresponding to said respective time pointer means in accordance with the time information generated by said clock means.

7. A device for presetting a television program or the like, comprising clock means for generating time information, a program board provided with a plurality of time pointer means the positions of which are optionally changed respectively to designate the times at which a television receiver is to be operated, a plurality of recording means provided separately from and each for each of said time pointer means for presetting channels to be received, and means for reading information recorded in the recording means corresponding to said timer pointer means in accordance with the time information generated by said clock means and applying to said television receiver signals for receiving preset channels, in which said program board is provided with two opposed electrodes one of which is a sectional electrode including a plurality of electrode sections, and means for reading an output signal which is generated when a pulse is applied between the electrodes in accordance with the electrostatic capacity of said pulse, and further comprising dielectrics of different dielectric constants put together into an integral piece and arranged as said time pointer means for each sectional electrode, whereby said recording means and said time pointer means are collated in accordance with an output signal of said reading means.

* * * * *